(12) United States Patent
Thaemlitz

(10) Patent No.: US 9,115,304 B2
(45) Date of Patent: Aug. 25, 2015

(54) WELLBORE SERVICING FLUID SYSTEM AND METHODS OF USE

(75) Inventor: Carl Joseph Thaemlitz, Cypress, TX (US)

(73) Assignee: Halliburton Energy Services, Inc., Houston, TX (US)

(*) Notice: Subject to any disclaimer, the term of this patent is extended or adjusted under 35 U.S.C. 154(b) by 486 days.

(21) Appl. No.: 13/442,653

(22) Filed: Apr. 9, 2012

(65) Prior Publication Data

US 2013/0267444 A1  Oct. 10, 2013

(51) Int. Cl.
| | |
|---|---|
| C09K 8/08 | (2006.01) |
| C09K 8/36 | (2006.01) |
| C09K 8/34 | (2006.01) |
| C23F 11/14 | (2006.01) |
| C09K 8/60 | (2006.01) |
| C09K 8/52 | (2006.01) |

(52) U.S. Cl.
CPC .... *C09K 8/36* (2013.01); *C09K 8/52* (2013.01)

(58) Field of Classification Search
CPC ....... C09K 8/52; C09K 8/524; Y10S 507/929
USPC ......... 507/110, 127, 139, 211, 234, 244, 260, 507/261, 929, 209
See application file for complete search history.

(56) References Cited

U.S. PATENT DOCUMENTS

| | | | |
|---|---|---|---|
| 3,125,517 A | 3/1964 | Voda | |
| 3,804,760 A | 4/1974 | Darley | |
| 4,233,162 A | 11/1980 | Carney | |
| 4,670,550 A | 6/1987 | Bleeker et al. | |
| 4,713,183 A | 12/1987 | Patel et al. | |
| 5,034,140 A | 7/1991 | Gardner et al. | |
| 5,238,065 A | 8/1993 | Mondshine et al. | |
| 5,254,531 A | 10/1993 | Mueller et al. | |
| 5,888,944 A | 3/1999 | Patel | |
| 5,905,061 A | 5/1999 | Patel | |
| 5,977,031 A | 11/1999 | Patel | |
| 5,985,800 A | 11/1999 | Patel | |
| 6,218,342 B1 | 4/2001 | Patel | |
| 6,589,917 B2 | 7/2003 | Patel et al. | |
| 6,790,811 B2 | 9/2004 | Patel | |
| 6,806,233 B2 | 10/2004 | Patel | |
| 6,877,563 B2 | 4/2005 | Todd et al. | |
| 6,989,354 B2 | 1/2006 | Thaemlitz et al. | |
| 7,152,697 B2 | 12/2006 | Horton et al. | |
| 7,178,594 B2 | 2/2007 | Patel | |
| 7,238,646 B2 | 7/2007 | Thaemlitz et al. | |
| 7,377,721 B2 | 5/2008 | Patel | |
| 7,431,088 B2 | 10/2008 | Moorehead et al. | |
| 7,435,706 B2 | 10/2008 | Mueller et al. | |
| 7,527,097 B2 | 5/2009 | Patel | |
| 7,638,466 B2 | 12/2009 | Mueller et al. | |
| 7,906,464 B2 | 3/2011 | Davidson | |
| 8,105,989 B2 | 1/2012 | Svoboda et al. | |
| 8,181,702 B2 | 5/2012 | Bustos et al. | |
| 2006/0223714 A1 | 10/2006 | Svoboda et al. | |
| 2006/0223715 A1* | 10/2006 | Svoboda et al. | ............... 507/265 |
| 2007/0173416 A1 | 7/2007 | Moorehead et al. | |
| 2009/0286701 A1* | 11/2009 | Davidson | ....................... 507/235 |
| 2012/0181019 A1 | 7/2012 | Saini et al. | |
| 2013/0264057 A1 | 10/2013 | Thaemlitz | |

FOREIGN PATENT DOCUMENTS

| | | |
|---|---|---|
| AU | 720580 B2 | 6/2000 |
| EP | 0137538 A2 | 4/1985 |
| WO | 9805733 A1 | 2/1998 |
| WO | 2004069958 A1 | 8/2004 |

OTHER PUBLICATIONS

Foreign communication from a related counterpart application—International Search Report and Written Opinion, PCT/US2013/030782, Jun. 13, 2013, 12 pages.
Office Action dated May 5, 2014 (23 pages), U.S. Appl. No. 13/442,610, filed Apr. 9, 2012.
Halliburton Technology Bulletin, "N-FLOW™ Service," No. SMA-08-041-A, Nov. 5, 2009, 28 pages, Halliburton.
Patel, Arvind D., "Reversible Invert Emulsion Drilling Fluids—A Quantum Leap in Technology," IADC/SPE 47772, 1998, pp. 1-11, Asia Pacific Drilling Technology, Society of Petroleum Engineers.
Patel, et al., "Reversible Invert Emulsion Drilling Fluids: Controlling Wettability and Minimizing Formation Damage," SPE 54764, 1999, pp. 1-7, Society of Petroleum Engineers.
Patent application entitled "Wellbore Servicing Fluid System and Methods of Use," by Carl Joseph Thaemlitz, filed Apr. 9, 2012 as U.S. Appl. No. 13/442,610.

* cited by examiner

*Primary Examiner* — Aiqun Li
(74) *Attorney, Agent, or Firm* — Haynes and Boone, LLP

(57) ABSTRACT

A wellbore servicing composition comprising a filter cake positioned within a wellbore, the filter cake comprising an invert emulsion fluid, the invert emulsion fluid comprising an oleaginous fluid, a non-oleaginous fluid, and an acid-sensitive surfactant, and an emulsion reversing fluid positioned within the wellbore in contact with the filter cake, the emulsion reversing fluid comprising an acid precursor, wherein the acid precursor is not an acid.

13 Claims, No Drawings

WELLBORE SERVICING FLUID SYSTEM AND METHODS OF USE

CROSS-REFERENCE TO RELATED APPLICATIONS

This application is related to U.S. patent application Ser. No. 13/442,610 filed concurrently herewith and entitled "Wellbore Servicing Fluid System and Methods of Use," which is incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Hydrocarbons, such as oil and gas, are often produced from wellbores penetrating hydrocarbon-bearing subterranean formations or portions thereof. Conventionally, a subterranean formation is prepared for the production of oil and/or gas therefrom by drilling a wellbore into the subterranean formation. During the drilling operation, a drilling fluid, also referred to as drilling mud, is conventionally circulated through the wellbore as the bore borehole is drilled. The presence of such a drilling mud aids in the drilling operation, for example, by removing cuttings from the wellbore, (e.g., by suspending and releasing cuttings returned to the surface), controlling pressures within the subterranean formation, sealing permeable and/or semi-permeable portions of the subterranean formation, stabilizing the subterranean formation, cooling and lubricating the drilling apparatus, and facilitating completion operations. As the drilling mud is circulated through the wellbore during a drilling operation, the drilling mud is deposited on the surfaces of the growing wellbore in a thin, low-permeability layer known as a filter cake, thus inhibiting the loss of mud and/or mud filtrate or other wellbore fluids to the formation during the drilling and/or other servicing operations. In addition, drilling mud may be utilized in formation evaluation procedures, such as well logging.

Various types of drilling muds may be suitable for use during drilling operations. Generally, types of drilling muds include water-based drilling fluids and oil-based drilling fluids. Often, either intentionally or unintentionally, some amount of water may be present within such oil-based drilling fluids, thereby making water-in-oil emulsions (also known as invert emulsions). Often, the selection of a given type and/or configuration of drilling mud is often based upon the properties associated with that type of drilling mud.

Where oil-based muds, particularly, invert emulsion muds, are selected, one or more surfactants may be employed to stabilize the emulsion. However, such invert emulsion drilling muds comprising conventional surfactants result in filter cakes that are difficult to thoroughly remove without damaging the formation and/or the wellbore. As will be appreciated by those of skill in the art, the productivity of the wellbore is dependent upon the removal of the filter cake without damage to the formation or the wellbore.

Accordingly, there exists a need for an improved wellbore servicing fluid system and methods of using the same.

SUMMARY

Disclosed herein is a wellbore servicing method comprising circulating an invert emulsion fluid through a wellbore to form a filter cake within the wellbore, wherein the invert emulsion fluid comprises an oleaginous fluid, a non-oleaginous fluid, and an acid-sensitive surfactant, contacting at least a portion of the filter cake with an emulsion reversing fluid, wherein the emulsion reversing fluid comprises an acid precursor, wherein the acid precursor is not an acid, and wherein the acid precursor is configured to generate a quantity of acid after a predetermined delay period beginning at placement within a wellbore, allowing the emulsion reversing fluid to remain in contact with the filter cake for a soak period, and removing the filter cake from the wellbore.

Also disclosed herein is a wellbore servicing method comprising contacting at least a portion of a filter cake in a wellbore with an emulsion reversing fluid, wherein the filter cake comprises an invert emulsion fluid, wherein the invert emulsion fluid comprises an oleaginous fluid, a non-oleaginous fluid, and an acid-sensitive surfactant, wherein the emulsion reversing fluid comprises an acid precursor, wherein the acid precursor is not an acid, and wherein the acid precursor is configured to generate a quantity of acid after a predetermined delay period beginning at placement within a wellbore, allowing the emulsion reversing fluid to remain in contact with the filter cake for a soak period, and removing the filter cake from the wellbore.

Further disclosed herein is a wellbore servicing composition comprising a filter cake positioned within a wellbore, the filter cake comprising an invert emulsion fluid, the invert emulsion fluid comprising an oleaginous fluid, a non-oleaginous fluid, and an acid-sensitive surfactant, and an emulsion reversing fluid positioned within the wellbore in contact with the filter cake, the emulsion reversing fluid comprising an acid precursor, wherein the acid precursor is not an acid.

BRIEF DESCRIPTION OF THE DRAWINGS

Not applicable.

DETAILED DESCRIPTION OF THE EMBODIMENTS

The present invention is susceptible to embodiments of different forms. Specific embodiments are described in detail, with the understanding that the present disclosure is not intended to limit the invention to the embodiments described herein. It is to be fully recognized that the different teachings of the embodiments discussed herein may be employed separately or in any suitable combination to produce desired results.

Unless otherwise specified, use of the terms "up," "upper," "upward," "up-hole," "upstream," or other like terms shall be construed as generally from the formation toward the surface or toward the surface of a body of water; likewise, use of "down," "lower," "downward," "down-hole," "downstream," or other like terms shall be construed as generally into the formation away from the surface or away from the surface of a body of water, regardless of the wellbore orientation. Use of any one or more of the foregoing terms shall not be construed as denoting positions along a perfectly vertical axis.

Unless otherwise specified, use of the term "subterranean formation" shall be construed as encompassing both areas below exposed earth and areas below earth covered by water such as ocean or fresh water.

Disclosed herein are one or more embodiments of a wellbore servicing fluid (WSF) system and methods of using the same. In an embodiment, the WSF system disclosed herein generally comprises an invert emulsion fluid (IEF) comprising an acid-sensitive surfactant and an invert emulsion reversing fluid (ERF) comprising an acid precursor. In an embodiment, an IEF and an ERF, as will be disclosed herein, may be incorporated within a single fluid. Although the WSF system (comprising the IEF and the ERF) disclosed herein may be described as pertaining to a particular wellbore servicing operation (e.g., a drilling operation), one of skill in the art viewing this disclosure will recognize that the WSF system and/or components thereof disclosed herein may be suitably employed in one or more additional wellbore servicing operations. For example, in an embodiment the WSF system may be utilized in one or more of drilling, preparing for completion, and completing a wellbore penetrating a subterranean formation. In an additional embodiment, the WSF system may be employed in evaluating a subterranean formation penetrated by a wellbore. In additional embodiments, a WSF system and/or components thereof may be used in various other wellbore servicing operations, as will be apparent to one skilled in the art upon viewing this application. As will be appreciated by one of skill in the art viewing this disclosure, the concentration of one or more of components of the WSF system (e.g., components of the IEF and/or the ERF) may be varied dependent upon the intended use and/or the intended properties of the WSF system.

In an embodiment, the IEF generally comprises an oleaginous fluid, a non-oleaginous fluid, an acid-sensitive surfactant, and, optionally, one or more additives or additional components, which may comprise oil-wet solids.

In an embodiment, the oleaginous fluid generally comprises any suitable oil. Examples of a suitable oleaginous fluids include, but are not limited to petroleum oils, natural oils, synthetically-derived oils, or combinations thereof. More particularly, examples of a suitable oleaginous fluid include, but are not limited to, diesel oil, kerosene oil, mineral oil, synthetic oil, such as polyolefins (e.g., alpha-olefins and/or internal olefins), polydiorganosiloxanes, esters, diesters of carbonic acid, paraffins, or combinations thereof.

The concentration of the oleaginous fluid should be sufficient so that an invert emulsion forms and may be less than about 99% by volume of the invert emulsion. In one embodiment the amount of oleaginous fluid is from about 30% to about 95% by volume and more preferably about 40% to about 90% by volume of the invert emulsion fluid.

In an embodiment, the non-oleaginous fluids generally comprise any suitable aqueous liquid. Examples of suitable non-oleaginous fluids include, but are not limited to, sea water, freshwater, naturally-occurring and artificially-created brines containing organic and/or inorganic dissolved salts, liquids comprising water-miscible organic compounds, and combinations thereof. Examples of suitable brines include, but are not limited to, chloride-based, bromide-based, or formate-based brines containing monovalent and/or polyvalent cations and combinations thereof. Examples of suitable chloride-based brines include, but are not limited to, sodium chloride and calcium chloride. Examples of suitable bromide-based brines include, but are not limited to, sodium bromide, calcium bromide, and zinc bromide. Examples of suitable formate-based brines include, but are not limited to, sodium formate, potassium formate, and cesium formate.

In an embodiment, the non-oleaginous fluid may be present in an amount of less than about 70% by volume of the IEF, alternatively, from about 1% to about 70% by volume, alternatively, from about 5% to about 60% by volume.

For example, in an embodiment, the IEF may comprise from about 1% to about 60% non-oleaginous fluid by volume and about 40% to about 99% oleaginous fluid by volume, alternatively, from about 30% to about 50% non-oleaginous fluid by volume and about 50% to 70% oleaginous fluid by volume.

In an embodiment, the acid-sensitive surfactant generally comprises any suitable surfactant, also referred to as an emulsifier, capable of stabilizing an emulsion. As used herein, an emulsion is considered stable if the oleaginous and the non-oleaginous fluids do not substantially separate after agitation. For example, a stabilized emulsion may last for more than about 1 minute after the halting the agitation by which the emulsion was formed, alternatively, longer than about 5, 10, 15, 20, 30, 60, 90, 120, or more minutes. In an embodiment, the acid-sensitive surfactant may be characterized as acid-sensitive because contact with an acid may alter the character thereof. For example, not intending to be bound by theory, sufficient protonation of the acid-sensitive surfactant may cause a water-in-oil (invert) emulsion, which is stabilized by the acid-sensitive surfactant, to be converted to an oil-in-water emulsion.

Examples of suitable acid-sensitive surfactants acid include, but are not limited to, hydrolyzable mixed alkyldiethanol amides, alkyl glucosides, polyalkylglucosides, alkylalkoxypolydimethylsiloxanes, polyalkyldimethylsiloxanes, or combinations thereof.

In an embodiment, the acid-sensitive surfactant comprises the product of the reaction between a mixed alkyl carboxylic acid and diethanol amine, wherein the mixed alkyl acid comprises at least about 40% by weight linoleic acid. In such an embodiment, the mixed alkyl acid may comprise less than about 35% by weight of oleic acid.

In another embodiment, the acid-sensitive surfactant comprises the product of a transamidification reaction between diethanol amine and an alkyl carboxylic acid ester. The ester reactant may be a simple ester, such as a methyl or ethyl ester of the alkyl carboxylic acid ester or it may be a naturally occurring ester, such as a triglyceride. The ester reactant may comprise soya oil, sunflower oil, corn oil, safflower oil, or combinations thereof in the transamidification reaction. In such an embodiment, the emulsifier may be the product of a 1:1 molar ratio of the ester reactant and the amine. As may be appreciated by one of skill in the art viewing this disclosure, the product resulting from the above-noted transamidification reaction between alkyl carboxylic acid esters (e.g., which may be mixed alkyl carboxylic acid esters) and diethanol amine may be a complex mixture. For example, the resulting product may comprise a mixture of compounds including amides, amines, alkyl acids, and other side products.

In another embodiment, the acid-sensitive surfactant comprises an amine generally represented by the formula:

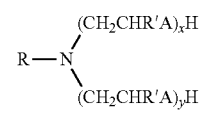

wherein R is an organic group having from about 12 to about 22 carbon atoms (e.g., a $C_{12}$ to $C_{22}$), R' is independently selected from hydrogen or $C_1$ to $C_3$ alkyl group, A is NH or O, and the sum of x and y ranges from about 1 to about 3, alternatively, from 1 to 3 (e.g., $1 \leq x+y \leq 3$), alternatively, from greater than 1 to less than 3 (e.g., $1 < x+y < 3$). In a particular embodiment, the R group may be a $C_{12}$ to $C_{22}$ aliphatic hydrocarbon. In an additional embodiment, R may be a non-cyclic aliphatic. In an embodiment, the R group comprises at least one degree of unsaturation. For example, at least one carbon-carbon double bond may be present within the R group. Examples of suitable R groups include, but are not limited to, commercially recognized mixtures of aliphatic hydrocarbons such as soya, which is a mixture of $C_{14}$ to $C_{20}$ hydrocarbons, or tallow which is a mixture of $C_{16}$ to $C_{20}$ aliphatic hydrocarbons, or tall oil which is a mixture of $C_{14}$ to $C_{18}$ aliphatic hydrocarbons. In a particular embodiment in which the A group comprises NH, the sum of x and y may be 2 and the value of x may be 1. In yet another embodiment in which the A group comprises O, the sum of x and y may be 2 and the value of x may be 1. Examples of suitable amine surfactants include, but are not limited to, Ethomeen T/12, a diethoxylated tallow amine; Ethomeen S/12, a diethoxylated soya amine; Duomeen O, a N-oleyl-1,3-diaminopropane, and Duomeen T, a N-tallow-1,3-diaminopropane, all of which are commercially available from Akzo.

In another embodiment, the acid-sensitive surfactant comprises an amine generally represented by the formula:

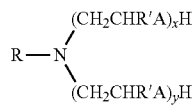

wherein R is a cycloaliphatic hydrocarbon, each R' may be the same or different and is H or an alkyl having from about 1 to about 3 carbon atoms, each A may be the same or different and is NH or O, and the sum of x and y ranges from about 1 to about 20, alternatively, from 1 to 20 (e.g., $1 \leq x+y \leq 20$), alternatively, from greater than 1 to less than 20 (e.g., $1<x+y<20$). In an embodiment, R may comprise an aromatic group. In a particular embodiment, R is a hydrocarbon selected from the group consisting of abietyl, hydroabietyl, dihydroabietyl, tetrahydroabietyl, and dehydroabietyl, R' is H, and A is O. In another particular embodiment, the amine is an ethoxylated rosin amine. As used herein, the term "rosin amine" refers to the primary amines derived from various rosins or rosin acids, whereby the carboxyl of the rosin or rosin acid is converted to an amino ($-NH_2$) group. Examples of suitable rosin amines include, but are not limited to, gum and wood rosin amines primarily containing abietyl, rosin amine derived from hydrogenated gum or wood rosin and primarily containing dehydroabietylamine, rosin amine derived from hydrogenated gum or wood rosin and primarily containing dihydro- and tetrahydroabietylamine, heat treated rosin amine derived from heat treated rosin, polymerized rosin amine derived from polymerized rosin, isomerized rosin amine derived from isomerized rosin and containing substantial amounts of abietylamine, rosin amines derived from pure rosin acids (e.g., abietylamine, dihydroabietylamine, dehydroabietylamine, and tetrahydroabietylamine), or combinations thereof.

In an embodiment, the acid-sensitive surfactant may be present within the IEF, as noted above, in an amount sufficient to stabilize the invert emulsion. While the concentration may vary depending on the particular components in the drilling fluid or mud, in an embodiment, the acid-sensitive surfactant may be present in an amount less than about 10% by weight of the IEF, alternatively, less than about 9%, alternatively, less than about 8%. In an embodiment, the acid-sensitive surfactant may be present in the IEF in a concentration of from about 0.1% to about 5% by weight of the IEF, alternatively, in a concentration of from about 1 to about 4% by weight of the IEF.

In an embodiment, optionally, one or more additional surfactant compounds may be included with the acid-sensitive surfactant. In such an embodiment, it is important that the quantity and nature of any such additional surfactant not interfere with the ability of the acid-sensitive surfactant to perform as described herein. Thus, as will be appreciated by one of skill in the art viewing this disclosure, the suitability any such additional surfactant may be dependent upon the acid-sensitive surfactant that is used. Examples of such an additional surfactant may include, but are not limited to, a polyaminated fatty acid, a diethanolamide of a fatty acid, an imidazoline, a phosphate ester, a phosphonate ester, a fatty acid, a dimer fatty acid, polymeric fatty acids, and combinations thereof. An example of a suitable polyaminated fatty acid is commercially available from Halliburton Energy Services under the tradename LE SUPERMUL. An example of a suitable diethanolamide of a fatty acid is commercially available from Akzo Nobel Inc. under the tradename Witcamide 511. The amount of additional surfactant present in the IEF preferably ranges from about 0.0 vol. % to about 3 vol. % based on the total volume of the IEF, alternatively, from about 0.1 vol. % to about 2 vol. %, alternatively, from about 0.2 vol. % to about 1 vol. %. In an embodiment, not intending to be bound by theory, the additional surfactant may function to improve the oil-wetting properties of the IEF.

In an embodiment, the IEF may, optionally, comprise one or more additives or additional components, as may be suitable depending upon the end use of the IEF. In such an embodiment, such additives may include, but are not limited to, wetting agents, organophilic clays, viscosifiers, weighting agents, thinning agents, bridging agents, fluid loss control agents, drilling solids made during the course of drilling (e.g., drill cuttings), or combinations thereof. In such an embodiment, the additives may be selected so as to not interfere with the ability of the acid-sensitive surfactant to perform as described herein. Thus, as will be appreciated by one of skill in the art viewing this disclosure, the suitability of any such oil-wet solids and/or additional additives may be dependent upon the acid-sensitive surfactant that is used.

Examples of suitable thinning agents may include, but are not limited to, thinners as disclosed in U.S. Pat. No. 7,435,706 to Mueller and in U.S. Pat. No. 7,638,466 to Mueller, each of which is incorporated herein in its entirety.

Examples of suitable wetting agents may include, but are not limited to, crude tall oil, oxidized crude tall oil, organic phosphate esters, modified imidazolines and amidoamines, alkyl aromatic sulfates and sulfonates, and the like, and combinations or derivatives thereof. In an embodiment, the use of fatty acid wetting agents may be minimized so as to not adversely affect the breakability of the invert emulsion disclosed herein. Examples of suitable commercially available wetting agents from Halliburton Energy Services include, but are not limited to, EZ-MUL®, INVERMUL®, and FORTIMUL®. Examples of suitable wetting agents commercially available wetting agents from Union Carbide Chemical Company Inc. include Silwet L-77, L-7001, L7605 and L-7622.

In an embodiment, organophilic clays, which may be, for example, amine-treated clays, may be useful as viscosifiers in the IEF. In an additional or alternative embodiment, the viscosifier may comprise oil soluble polymers, polyamide resins, polycarboxylic acids, soaps or combinations thereof. The viscosifier may be present within the IEF in a range of from about 0.1% to about 6% by weight of the IEF. As will be appreciated by one of skill in the art viewing this disclosure, the amount of viscosifier may be varied depending upon the intended application. An example of a suitable organoclay material commercially available from Halliburton Energy Services includes GELTONE II®. An example of a suitable polyamide resin material commercially available from Halliburton Energy Services includes, but is not limited to, TEMPERUS™.

Examples of suitable the weighting agents, or density-adjusting materials, may include, but are not limited to, hematite, magnetite, iron oxides, magnesium oxides, illmenite, barite, siderite, celestite, dolomite, calcite, halite, the like, or combinations thereof. The quantity of such material added, if any, depends upon the desired density of the final composition. In an embodiment, the weighting agents, or density-adjusting materials, may be present in the IEF in an amount sufficient to yield a fluid density of up to about 24 pounds per gallon, alternatively, up to about 21 pounds per gallon, alternatively, up to about 19.5 pounds per gallon. As will be appreciated by one of skill in the art viewing this disclosure, the amount of weighting agents may be varied depending upon the intended application.

In an embodiment, the fluid loss control agent generally comprises an additive to suitably coat the walls of the borehole as the wellbore is being drilled. Examples of suitable fluid loss control agents include, but are not limited to, modified lignites, asphaltic compounds, gilsonite, organophilic humates prepared by reacting humic acid with amides or polyalkylene polyamines, other non-toxic fluid loss additives, or combinations thereof. In an embodiment, the fluid loss control agent may be present within the IEF in an amount less than about 10%, alternatively, less than about 5% by weight of the IEF. An example of a suitable fluid loss control material commercially available from Halliburton Energy Services includes, but is not limited to, ADAPTA®.

In an embodiment, as may be appreciated by one of skill in the art viewing this disclosure, one or more of the additives or additional components as may be present within the IEF may comprise solids. In such an embodiment, any such solids may be added to IEF (e.g., during formulation of the IEF) or may result upon introduction into and/or utilization within a wellbore (e.g, drill cuttings suspended within the IEF resultant when the IEF is utilized as a drilling fluid).

In an embodiment, one or more of the solids within the IEF may comprise oil-wet solids. As the term is used herein, the term "oil-wet solids" is used to refer to any particulate solid that is either intentionally or unintentionally a component of the IEF as determined by one or more of the following tests. A small portion of the solids are clumped together to form a small ball or mass. This small ball or mass is carefully dropped into a container holding water or some other aqueous fluid such as brine, sea water, or the like. If the clump or small ball of solid particles readily breaks apart and disperses, the solids are considered to be water-wet. If, however, the clump or small ball sinks and forms a reasonably consolidated mass on the bottom of the container, the solids are considered to be oil-wet. Another test is to place a small portion of the solids in the bottom of a test tube. If, upon the addition of water followed by agitation, the mass at the bottom of the tube is readily suspended in the water, the solids are considered to be water-wet. If, however, the mass of particles are difficult to break apart or to suspend upon agitation, the solids are considered to be oil-wet. A similar test may be conducted utilizing a clear oil in place of the water, in which case the water-wet solids will be difficult to suspend in and the oil-wet solids will readily break-up and become suspended in the oil.

As may be appreciated by one of ordinary skill in the art viewing this disclosure, the solids contained in the drilling mud form the filter cake about the periphery of the wellbore during the drilling of the well. Thus, when a oil-based drilling mud is utilized to drill a well, the solids that make up the filter cake may be described as oil-wet. In an embodiment, when the IEF is utilized as a drilling fluid, the solids present within the IEF, which may be oil-wet solids, may be incorporated within the filter cake. Therefore, in such an embodiment, a filter cake formed from during drilling while utilizing an IEF as disclosed herein may comprise various oil-wet solids.

In an embodiment, the IEF may be prepared via any suitable method or process. For example, methods conventionally employed to prepare a similar invert emulsion drilling muds may be used to prepare the IEF disclosed herein. In an embodiment, a desired quantity of oleaginous fluid, such as a base oil, and a suitable amount of acid-sensitive surfactant (e.g., emulsifier) are mixed together and the remaining components are added substantially simultaneously or sequentially with continuous or semi-continuous mixing. The IEF disclosed herein is formed by vigorously agitating, mixing, or shearing the oleaginous fluid and the non-oleaginous fluid.

In an embodiment, ERF disclosed herein generally comprises an acid precursor, a base fluid, and, optionally, one or more additives. In an embodiment, the ERF may be configured for in situ placement within a wellbore and, thereafter, the generation of an acid, as will be described herein.

In an embodiment, the acid precursor generally refers to a component, which itself does not act as an acid by significantly decreasing the pH of a solution into which it is introduced, but which, upon degradation, will yield one or more components capable of acting as an acid by decreasing the pH of that solution. For example, in an embodiment an acid precursor may yield one or more components capable of decreasing the pH of a solution by about 0.1 pH units, alternatively, about 0.2 pH units, alternatively, about 0.5 pH units, alternatively, about 1.0 pH units, alternatively, about 1.5 pH units, alternatively, about 2.0 pH units, alternatively, about 2.5 pH units, alternatively, about 3.0 pH units, alternatively, about 4.0 pH units, alternatively, about 5.0 pH units, alternatively, about 6.0 pH units, alternatively, about 7.0 or more pH units. In an embodiment, the acid precursor may comprise an ester which may to degrade into an acid, for example, by hydrolyzing with water. In an embodiment, the acid precursor may comprise a suitable lactone or lactide, an acetate ester, a formate ester, a lactate ester, a polyester, or combinations thereof. Examples of suitable acid precursors include, but are not limited to, lactide, glucono-delta-lactone, glucoheptonic lactone, glyceryl diacetate, glyceryl triacetate, ethylene glycol monoformate, diethylene glycol diformate, butyl lactate, propyl lactate, polylactic acid, and combinations thereof. Examples of suitable acid precursors are commercially available from Halliburton Energy Services as a part of the N-Flow™ line of service formulations.

In an embodiment, the acid precursor may be characterized as exhibiting a suitable delay time. As used herein, the term "delay time" refers to the period of time from when an acid precursor, or a combination of acid precursors, is introduced into an operational environment until the acid precursor or combination of precursors has degraded a sufficient degree to alter the acid-sensitive surfactant, as will be disclosed herein. As will be appreciated by one of skill in the art viewing this disclosure, differing acid precursors may exhibit varying delay times. As such, in an embodiment, an acid precursor, or combination of acid precursors, may be selected for inclusion in the ERF such that the acid precursor(s) exhibit a desired average delay time. In an embodiment, the acid precursor may exhibit an average delay time of at least about 1 hour, alternatively, at least about 2 hours, alternatively, at least about 4 hours, alternatively, at least about 8 hours, alternatively, at least about 12 hours, alternatively, at least about 24 hours. As will be appreciated by one of skill in the art viewing this disclosure, the average delay time may be dependent upon the particular acid precursor or combination of acid precursors utilized, the temperature of the operational environment, the presence or absence of any additional components, or combinations thereof, as will be disclosed herein below.

In an embodiment, the acid precursor may be characterized as operable, as disclosed herein, within a suitable temperature range. As will be appreciated by one of skill in the art viewing this disclosure, differing acid precursors may exhibit varying temperature ranges of operability. As such, in an embodiment, an acid precursor, or combination of acid precursors, may be selected for inclusion in the ERF such that the acid precursor(s) exhibit a desired operable temperature range (e.g., an ambient downhole temperature for a given wellbore). In addition, as will also be appreciated by one of skill in the art viewing this disclose, the degradation of the acid precursor may be influenced by the temperature of the operational environment. For example, the rate of degradation of a given acid precursor may be generally higher at generally higher temperatures. As such, the rate of degradation of a given acid precursor may be generally higher when exposed to the environment within the wellbore. In an embodiment, the acid precursor may exhibit an operable temperature range of from about 70° F. to about 300° F., alternatively, from about 80° F. to about 260° F., alternatively from about 90° F. to about 220° F.

In an embodiment, the acid precursor may be included within the ERF in a suitable amount. As will be appreciated by one of skill in the art viewing this disclosure, the concentration of the acid precursor within the ERF may be selected to achieve a given concentration of acid upon degradation of the acid precursor. As will also be appreciated by one of skill in the art viewing this disclosure, the resultant concentration and/or amount of acid that is necessary may be dependent upon the composition of the base fluid, as will be discussed herein; the presence or absence of various additives, as will be discussed herein; the composition of the filter cake; the thickness of the filter cake; the temperature of the operational environment (e.g., the wellbore); the desired amount of time necessary for removal of the filter cake; or combinations thereof. For example, in an embodiment the acid precursor may be present within the ERF in an amount from about 0.2% to about 40% by weight of the ERF, alternatively, from about 1% to about 30%, alternatively, from about 5% to about 25%.

In an embodiment, the base fluid comprises an aqueous brine. In such an embodiment, such an aqueous brine generally comprises water and an inorganic monovalent salt, an inorganic multivalent salt, or both. Such an aqueous brine may be naturally occurring or artificially-created. The water may be from any suitable source, examples of which include, but are not limited to, sea water, tap water, freshwater, produced water, or combinations thereof. Examples of suitable brines include, but are not limited to, chloride-based, bromide-based, or formate-based brines containing monovalent and/or polyvalent cations, salts of alkali and alkaline earth metals, and combinations thereof. Examples of suitable chloride-based brines include, but are not limited to, sodium chloride and calcium chloride. Examples of bromide-based brines include, but are not limited to, sodium bromide, calcium bromide, and zinc bromide. Examples of suitable formate-based brines include, but are not limited to, sodium formate, potassium formate, and cesium formate.

The salt or salts in the water may be present in an amount ranging from greater than about 0% by weight to a saturated salt solution. In a particular embodiment, the salt or salts in the water may be present within the base fluid in an amount sufficient to yield a saturated brine, alternatively, a nearly saturated brine.

In an embodiment, the ERF may, optionally, comprise one or more additional components. In an embodiment, such additional components may comprise one or more suitable breakers. As used herein, the term "breaker" is used to refer to a component of the ERF that cooperates with the acid-precursor in the removal of the filter cake. In such an embodiment, such a breaker may comprise an enzyme breaker, an oxidizing breaker, a chelant, or combinations thereof.

An example of a suitable enzyme breaker includes, but is not limited to, xanthanase, which is an enzyme configured for the degradation of xanthan polymers. Xanthanase may also be employed within the ERF as a catalyst of ester hydrolysis at suitable temperatures (e.g., less than 160° F.). An example of a suitable xanthanase is commercially available from Halliburton Energy Services as a part of the N-Flow™ line of service formulations.

Examples of a suitable oxidizing breaker include, but are not limited to an oxide, a peroxide, a hypochlorite, a persulfate, a perborate, the like or combinations thereof. Examples of suitable oxidizing breakers include, but are not limited to, GBW-40 Breaker (a lithium hypochlorite), Oxol II (a sodium perborate), and SP Breaker (a sodium persulfate).

Examples of suitable chelants include ethylenediaminetetraacetic acid (EDTA), dimercaptosuccinic acid (DMSA), dimercapto-propane sulfonate (DMPS), alpha lipoic acid (ALA), calcium disodium versante ($CaNa_2$-EDTA), D-penicillamine, deferoxamine, defarasirox, dimercaprol (BAL), glutamic acid diacetic acid (GLDA), or combinations thereof. An example of a suitable chelant is commercially available from AkzoNobel as Dissolvine® GL, which is a GLDA chelant.

In an additional embodiment, such an additional component may comprise a suitable buffer or buffering solution. As will be appreciated by one of skill in the art viewing this disclosure, such a buffer may be selected such that the buffer will not interfere with the acid precursor, as disclosed herein.

The WSF system having been disclosed, one or more embodiments of methods of using the WSF system in the performance of a wellbore servicing operation are also disclosed. For example, disclosed herein are methods of utilizing the disclosed WSF system in the performance of a drilling and completion operation.

In an embodiment, the WSF system may be utilized in a drilling and completion operation. In such an embodiment, an IEF as disclosed herein is utilized as a drilling mud by being circulated through the wellbore while the wellbore is drilled in a conventional manner. As will be appreciated by one of skill in the art viewing this disclosure, as the IEF is circulated through the wellbore, a portion of the IEF is deposited on the walls (e.g., the interior bore surface) of the wellbore, thereby forming a filter cake. As will also be appreciated by one of skill in the art, such a filter cake may inhibit the loss of drilling mud (e.g., the IEF) or other fluids into the formation while also contributing to formation control and wellbore stability. In an embodiment, as the IEF is circulated through the wellbore during a drilling operation, the IEF suspends, and thereby removes drill cuttings from the wellbore; such drill cuttings may also be oil-wet. In addition, as will also be appreciated by one of skill in the art viewing this disclosure, such utilization of the IEF may result in various surfaces within the wellbore and/or the surfaces of the drill cuttings being oil-wet.

In an embodiment, when desired (for example, upon the cessation of drilling operations and/or upon reaching a desired depth), the wellbore or a portion thereof may be prepared for completion. In completing the wellbore, it may be desirable to remove all or a substantial portion of the filter cake from the walls of the wellbore and/or to alter the character of any oil-wet surface within the wellbore. In an embodiment, removing the filter cake may comprise contacting the filter cake and/or any oil-wet surfaces, which may have been formed by the circulation of the IEF during a drilling operation, with an ERF as disclosed herein. In such an embodiment, the ERF may be placed within the wellbore. In an embodiment, when a sufficient quantity of the ERF has been placed within the wellbore, the ERF may be allowed to remain in contact with the filter cake and/or any oil-wet surfaces for a sufficient period of time that the acid precursor within the ERF will generate a sufficient quantity of acid to convert a water-in-oil emulsion to an oil-in-water emulsion. For example, in such an embodiment the ERF may be allowed to remain in contact with the filter cake and/or any oil-wet surfaces for a soak-period, for example, for a period of time of at least about 2 hours, alternatively, at least about 4 hours, alternatively, at least about 8 hours, alternatively, at least about 16 hours, alternatively, at least about 24 hours, alternatively, at least about 36 hours, alternatively, at least about 48 hours, alternatively, at least about 60 hours, alternatively, at least about 72 hours, alternatively, at least about 84 hours, alternatively, at least about 100 hours. In an embodiment, during such a "soak period," the fluids within the wellbore may remain in a substantially static state, for example, as opposed to a dynamic state in which circulation may be present. In an embodiment, the wellbore may be shut-in while the ERF remains in contact with the filter cake and/or any oil-wet surfaces.

As noted above, the period of time necessary for the acid precursor to convert a water-in-oil emulsion to an oil-in-water emulsion may be dependent upon a variety of factors, including the particular formulation of the IEF and/or the ERF.

Not intending to be bound by theory, as the acid precursor degrades (e.g., hydrolyzes) or is otherwise converted into an acid within the wellbore, the acid generated by the acid precursor may serve to protonate the acid-sensitive surfactant within the IEF that forms the filter cake and/or any oil-wet surfaces. Such protonation of the acid-sensitive surfactant may convert the water-in-oil emulsion of the filter cake and/or any oil-wet surfaces to an oil-in-water emulsion. In particular, the generation of an acid may cause the oleaginous phase to change from the continuous phase to the discontinuous phase and the non-oleaginous fluid to change from the discontinuous phase to the continuous phase. As will be appreciated by one of skill in the art viewing this disclosure, the discontinuous phase, also referred to as the dispersed phase, forms a stable dispersion of fine droplets throughout the continuous phase. As a result of the conversion from a water-in-oil emulsion to an oil-in-water emulsion, the oil-wet particles of the filter cake and/or any other oil-wet surfaces may become water-wet. Additionally, the conversion to a water-wet state may allow the acid generated by the acid-precursor to contact and, thereby, dissolve or degrade any acid-soluble particles within the filter cake and/or any acid-soluble particles having oil-wet surfaces, thereby causing the filter cake and/or any oil-wet surfaces to degrade. As such, the filter cake may be removed. In addition, in an embodiment the resulting oil-in-water emulsion has a relatively low viscosity. Thus, the oil-in-water emulsion is less likely to plug the subterranean formation and, thus, less likely to cause damage to the formation.

In an embodiment, the method of using the WSF system may further comprise completing the wellbore. In such an embodiment, the wellbore, or a portion thereof, may be completed by providing a casing string within the wellbore and cementing or otherwise securing the casing string within the wellbore. In such an embodiment, the casing string may be positioned (e.g., lowered into) the wellbore to a desired depth prior to, concurrent with, or following provision of the ERF and/or degradation of the filter cake. When the filter cake has been sufficiently degraded and/or removed from the wellbore, the fluids of the WSF system, or any component thereof that remains within the wellbore, may be displaced from the wellbore by pumping a flushing fluid, a spacer fluid, and/or a suitable cementitious slurry downward through an interior flowbore of the casing string and into an annular space formed by the casing string and the wellbore walls. When the cementitious slurry has been so-positioned, the cementitious slurry may be allowed to set.

In an additional embodiment, the WSF system may be utilized in a formation evaluation operation, for example, by electronically logging the wellbore. For example, in an embodiment, the wellbore may be evaluated via electronic logging techniques as will be appreciated by one of skill in the art viewing this disclosure, following sufficient contact between the filter cake and the ERF to degrade the filter, as disclosed herein. In such an embodiment, a method of evaluating a formation utilizing the WSF system may generally comprise circulating and IEF during a drilling operation and, upon the cessation of drilling operations and/or upon reaching a desired depth, removing the filter cake and/or any oil-wet surfaces from within the wellbore via the ERF, as disclosed herein above. Upon sufficient removal of the filter cake and/or conversion of the oil-wet surfaces to water-wet surfaces, logging tools, the utility of which will be appreciated by one of skill in the art viewing this disclosure, may be run into the wellbore to a sufficient depth to characterize a desired portion of the subterranean formation penetrated by the wellbore.

In another embodiment, the WSF system may be utilized to wash or clean-up drill cuttings removed from a wellbore. For example, as described herein above, drill cutting removed from a wellbore may comprise oil-wet surfaces. In an embodiment, drill cuttings removed from a wellbore drilling utilizing an IEF as disclosed herein may be contacted with and allowed to remain in contact with an ERF, as disclosed herein, for a period of time sufficient to allow the oil-wet surfaces of the drill cuttings to be converted to a water-wet state.

In an embodiment, the WSF system and methods of using the same disclosed herein may be advantageously employed in the performance of one or more wellbore servicing operations. For example, the usage of an invert emulsion fluid, like the IEF disclosed herein, in conjunction with an emulsion reversing fluid, like the ERF disclosed herein, allows for improved wellbore clean-up, for example, in preparation for wellbore completion and/or production. For example, because an emulsion reversing fluid, like the ERF disclosed herein, comprises an acid precursor (e.g., as opposed to an acid), such an emulsion reversing fluid can be positioned within the wellbore before any acid begins to degrade the filter cake. That is, because the acid precursor is not, itself, an acid, it can be positioned within the wellbore before the action of such an acid causes degradation of the filter cake. Conversely, utilizing an acid (as opposed to a composition that is not an acid upon placement) may cause the filter cake and/or oil-wet surfaces to be only partially removed from the wellbore. For example, the acid may remove the filter cake at a given point, thereby allowing fluid communication with the formation, before the entire filter cake is removed. That is, is not filter cake may be removed uniformly, and, as such, fluids (e.g., the acid) may be lost to the formation (e.g., "wormholing"). The loss of such acids to the formation may not only result in damage to the formation, but may also render efforts to remove the remainder of the filter cake and/or oil-wet surface ineffective. Thus, the WSF system disclosed herein may allow for more thorough and complete removal of the filter while lessening the risk that a filter cake will be incompletely removed. For example, in an embodiment, the WSF system may be characterized as allowing for at least 50% more of the filter cake to be removed from the wellbore in comparison to an otherwise similar wellbore in which the filter cake is removed conventionally (e.g., with an acid), alternatively, at least 60%, alternatively, at least 70%, alternatively, at least 80% more of the filter cake may be removed. In turn, the WSF system disclosed herein allows for improved production from hydrocarbon-bearing portions of the subterranean formation.

Additionally, in an embodiment, the WSF system and methods of using the same disclosed herein may also allow for improved wellbore clean-up by providing for the removal of emulsion fluids from the formation itself (e.g., from the pores within the subterranean formation into which the wellbore has been drilled). For example, as may be appreciated by one of skill in the art viewing this disclosure, conventional drilling fluids and/or methods conventionally employed to prepare wellbores for completion and/or production may result in the presence of emulsion fluids within the pores of the formation. For example, not intending to be bound by theory, by thoroughly converting the emulsion fluids from an oil-wet phase (e.g., as a water-in-oil emulsion) to a water-wet phase (e.g., as an oil-in-water emulsion), any invert emulsion fluids that may have flowed into the formation can flow out. As such, the instant WSF system and methods of using the same allow for a more complete removal of the invert emulsion fluids from the wellbore and/or the surrounding formation, thereby improving the productivity of the well.

Further, not intending to be bound by theory, by thoroughly converting the emulsion fluids from an oil-wet phase (e.g., as a water-in-oil emulsion) to a water-wet phase (e.g., as an oil-in-water emulsion), subsequent wellbore completion operations, for example, well cementing operations, may also be improved in that, because the wellbore surfaces may be substantially water-wet (as opposed to being oil-wet or, water-wet to a lesser degree), cementitious compositions introduced into the wellbore (e.g., for the purpose of completing the wellbore, isolating adjacent zones of the formation, sealing the annular space formed by the casing, or the like) may better adhere thereto, may maintain the desired rheological properties and/or may demonstrated improved strength characteristics.

In yet another embodiment, the WSF system and methods of using the same disclosed herein may be more environmentally acceptable and less hazardous, in comparison to conventional fluids. For example, while acids, such as HCl are conventionally utilized in the removal of filter cakes from wellbore, the non-acid acid precursors of the instantly disclosed WSF system lessen the risk of damage to the formation, lessen corrosion to wellbore servicing equipment utilized in the performance of such operations, and present less of a safety risk to personnel associated with such operations.

Additional advantages of the WSF system and/or the methods of using the same may be apparent to one of skill in the art viewing this disclose.

Additional Disclosures

The following are nonlimiting, specific embodiments in accordance with the present disclosure:

Embodiment A. A wellbore servicing method comprising:

circulating an invert emulsion fluid through a wellbore to form a filter cake within the wellbore, wherein the invert emulsion fluid comprises an oleaginous fluid, a non-oleaginous fluid, and an acid-sensitive surfactant;

contacting at least a portion of the filter cake with an emulsion reversing fluid, wherein the emulsion reversing fluid comprises an acid precursor, wherein the acid precursor is not an acid, and wherein the acid precursor is configured to generate a quantity of acid after a predetermined delay period beginning at placement within a wellbore;

allowing the emulsion reversing fluid to remain in contact with the filter cake for a soak period; and removing the filter cake from the wellbore.

Embodiment B. The method of embodiment A, wherein the delay period is at least 30 minutes.

Embodiment C. The method of one of embodiments A or B, wherein the delay period is at least 1 hour.

Embodiment D. The method of one of embodiments A through C, wherein the soak period is at least about 8 hours.

Embodiment E. The method of one of embodiments A through D, wherein the soak period is at least about 24 hours.

Embodiment F. The method of one of embodiments A through E, wherein the quantity of acid generated by the acid precursor is sufficient to convert at least a portion of the invert emulsion fluid forming the filter cake from a water-in-oil emulsion to an oil-in-water emulsion.

Embodiment G. The method of one of embodiments A through F, wherein the invert emulsion fluid further comprises one or more additives.

Embodiment H. The method of embodiment G, wherein at least one of the one or more additives comprises as oil-wet solid.

Embodiment I. The method of one of embodiments A through H, wherein the acid-sensitive surfactant comprises hydrolyzable mixed alkyldiethanol amides, alkyl glucosides, polyalkylglucosides, alkylalkoxypolydimethylsiloxanes, polyalkyldimethylsiloxanes, or combinations thereof.

Embodiment J. The method of one of embodiments A through H, wherein the acid-sensitive surfactant comprises an amine generally represented by the formula:

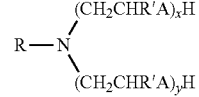

wherein R is $C_{12}$ to $C_{22}$, R' is independently selected from hydrogen or $C_1$ to $C_3$ alkyl group, A is NH or O, and the sum of x and y ranges from about 1 to about 3.

Embodiment K. The method of one of embodiments A through H, wherein the acid-sensitive surfactant comprises an amine generally represented by the formula:

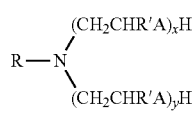

wherein R is a cycloaliphatic hydrocarbon, each R' may be the same or different and is H or an alkyl having from about 1 to about 3 carbon atoms, each A may be the same or different and is NH or O, and the sum of x and y ranges from about 1 to about 20.

Embodiment L. The method of embodiment K, wherein R is a hydrocarbon selected from the group consisting of abietyl, hydroabietyl, dihydroabietyl, tetrahydroabietyl, and dehydroabietyl, R' is H, and A is O.

Embodiment M. The method of one of embodiments A through H, wherein the acid-sensitive surfactant comprises an amine generally represented by the formula:

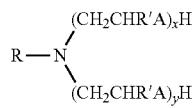

wherein R is an aromatic hydrocarbon, each R' may be the same or different and is H or an alkyl having from about 1 to about 3 carbon atoms, each A may be the same or different and is NH or O, and the sum of x and y ranges from about 1 to about 20.

Embodiment N. The method of one of embodiments A through M, wherein the acid precursor comprises an ester.

Embodiment O. The method of one of embodiments A through M, wherein the acid precursor comprises a lactone, a lactide, an acetate ester, a formate ester, a lactate ester, a polyester, or combinations thereof.

Embodiment P. The method of one of embodiments A through M, wherein the acid precursor comprises lactide, glucono-delta-lactone, glucoheptonic lactone, glyceryl diacetate, glyceryl triacetate, ethylene glycol monoformate, diethylene glycol diformate, butyl lactate, propyl lactate, polylactic acid, and combinations thereof.

Embodiment Q. A wellbore servicing method comprising:
contacting at least a portion of a filter cake in a wellbore with an emulsion reversing fluid,
wherein the filter cake comprises an invert emulsion fluid,
wherein the invert emulsion fluid comprises an oleaginous fluid, a non-oleaginous fluid, and an acid-sensitive surfactant,
wherein the emulsion reversing fluid comprises an acid precursor, wherein the acid precursor is not an acid, and wherein the acid precursor is configured to generate a quantity of acid after a predetermined delay period beginning at placement within a wellbore;
allowing the emulsion reversing fluid to remain in contact with the filter cake for a soak period; and
removing the filter cake from the wellbore.

Embodiment R. The method of embodiment Q, wherein the delay period is at least 30 minutes.

Embodiment S. The method of one of embodiments Q or R, wherein the delay period is at least 1 hour.

Embodiment T. The method of one of embodiments Q through S, wherein the soak period is at least about 8 hours.

Embodiment U. The method of one of embodiments Q through T, wherein the soak period is at least about 24 hours.

Embodiment V. The method of one of embodiments Q through U, wherein the quantity of acid generated by the acid precursor is sufficient to convert at least a portion of the invert emulsion fluid forming the filter cake from a water-in-oil emulsion to an oil-in-water emulsion.

Embodiment W. The method of one of embodiments Q through V, wherein the invert emulsion fluid further comprises one or more additives.

Embodiment X. The method of embodiment W, wherein at least one of the one or more additives comprises as oil-wet solid.

Embodiment Y. The method of one of embodiments Q through X, wherein the acid-sensitive surfactant comprises hydrolyzable mixed alkyldiethanol amides, alkyl glucosides, polyalkylglucosides, alkylalkoxypolydimethylsiloxanes, polyalkyldimethylsiloxanes, or combinations thereof.

Embodiment Z. The method of one of embodiments Q through X, wherein the acid-sensitive surfactant comprises an amine generally represented by the formula:

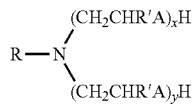

wherein R is $C_{12}$ to $C_{22}$, R' is independently selected from hydrogen or $C_1$ to $C_3$ alkyl group, A is NH or O, and the sum of x and y ranges from about 1 to about 3.

Embodiment AA. The method of one of embodiments Q through X, wherein the acid-sensitive surfactant comprises an amine generally represented by the formula:

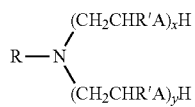

wherein R is a cycloaliphatic hydrocarbon, each R' may be the same or different and is H or an alkyl having from about 1 to about 3 carbon atoms, each A may be the same or different and is NH or O, and the sum of x and y ranges from about 1 to about 20.

Embodiment AB. The method of one of embodiments Q through X, wherein R is a hydrocarbon selected from the group consisting of abietyl, hydroabietyl, dihydroabietyl, tetrahydroabietyl, and dehydroabietyl, R' is H, and A is O.

Embodiment AC. The method of one of embodiments Q through X, wherein the acid-sensitive surfactant comprises an amine generally represented by the formula:

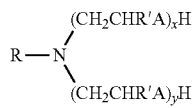

wherein R is an aromatic hydrocarbon, each R' may be the same or different and is H or an alkyl having from about 1 to about 3 carbon atoms, each A may be the same or different and is NH or O, and the sum of x and y ranges from about 1 to about 20.

Embodiment AD. The method of one of embodiments Q through AC, wherein the acid precursor comprises an ester.

Embodiment AE. The method of one of embodiments Q through AC, wherein the acid precursor comprises a lactone, a lactide, an acetate ester, a formate ester, a lactate ester, a polyester, or combinations thereof.

Embodiment AF. The method of one of embodiments Q through AC, wherein the acid precursor comprises lactide, glucono-delta-lactone, glucoheptonic lactone, glyceryl diacetate, glyceryl triacetate, ethylene glycol monoformate, diethylene glycol diformate, butyl lactate, propyl lactate, polylactic acid, and combinations thereof.

Embodiment AG. A wellbore servicing composition comprising:

a filter cake positioned within a wellbore, the filter cake comprising an invert emulsion fluid, the invert emulsion fluid comprising an oleaginous fluid, a non-oleaginous fluid, and an acid-sensitive surfactant; and an emulsion reversing fluid positioned within the wellbore in contact with the filter cake, the emulsion reversing fluid comprising an acid precursor, wherein the acid precursor is not an acid.

Embodiment AH. The composition of embodiment AG, wherein the acid precursor is configured to generate a quantity of acid within a delay period.

Embodiment AI. The composition of embodiment AH, wherein the delay period is at least 30 minutes.

Embodiment AJ. The composition of one of embodiments AH or AI, wherein the delay period is at least 1 hour.

Embodiment AK. The composition of one of embodiments AG through AJ, wherein the quantity of acid generated by the acid precursor is sufficient to convert at least a portion of the invert emulsion fluid forming the filter cake from a water-in-oil emulsion to an oil-in-water emulsion.

Embodiment AL. The composition one of embodiments AG through AK, wherein the invert emulsion fluid further comprises one or more additives.

Embodiment AM. The composition of embodiment AL, wherein at least one of the one or more additives comprises as oil-wet solid.

Embodiment AN. The composition of one of embodiments AG through AM, wherein the acid-sensitive surfactant comprises hydrolyzable mixed alkyldiethanol amides, alkyl glucosides, polyalkylglucosides, alkylalkoxypolydimethylsiloxanes, polyalkyldimethylsiloxanes, or combinations thereof.

Embodiment AO. The composition of one of embodiments AG through AM, wherein the acid-sensitive surfactant comprises an amine generally represented by the formula:

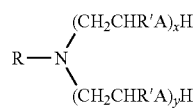

wherein R is $C_{12}$ to $C_{22}$, R' is independently selected from hydrogen or $C_1$ to $C_3$ alkyl group, A is NH or O, and the sum of x and y ranges from about 1 to about 3.

Embodiment AP. The composition of one of embodiments AG through AM, wherein the acid-sensitive surfactant comprises an amine generally represented by the formula:

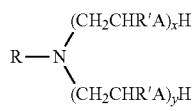

wherein R is a cycloaliphatic hydrocarbon, each R' may be the same or different and is H or an alkyl having from about 1 to about 3 carbon atoms, each A may be the same or different and is NH or O, and the sum of x and y ranges from about 1 to about 20.

Embodiment AQ. The composition of embodiment AP, wherein R is a hydrocarbon selected from the group consisting of abietyl, hydroabietyl, dihydroabietyl, tetrahydroabietyl, and dehydroabietyl, R' is H, and A is O.

Embodiment AR. The composition of one of embodiments AG through AM, wherein the acid-sensitive surfactant comprises an amine generally represented by the formula:

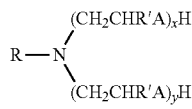

wherein R is an aromatic hydrocarbon, each R' may be the same or different and is H or an alkyl having from about 1 to about 3 carbon atoms, each A may be the same or different and is NH or O, and the sum of x and y ranges from about 1 to about 20.

Embodiment AS. The composition of one of embodiments AG through AR, wherein the acid precursor comprises an ester.

Embodiment AT. The composition of one of embodiments AG through AR, wherein the acid precursor comprises a lactone, a lactide, an acetate ester, a formate ester, a lactate ester, a polyester, or combinations thereof.

Embodiment AU. The composition of one of embodiments AG through AR, wherein the acid precursor comprises lactide, glucono-delta-lactone, glucoheptonic lactone, glyceryl diacetate, glyceryl triacetate, ethylene glycol monoformate, diethylene glycol diformate, butyl lactate, propyl lactate, polylactic acid, and combinations thereof.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A wellbore servicing composition comprising:
   a filter cake positioned within a wellbore, the filter cake comprising an invert emulsion fluid, the invert emulsion fluid comprising an oleaginous fluid, a non-oleaginous fluid, and an acid-sensitive surfactant; and
   an emulsion reversing fluid positioned within the wellbore in contact with the filter cake, the emulsion reversing fluid comprising an acid precursor, wherein the acid precursor is not an acid, and
   wherein the acid precursor is selected from the group consisting of glucono-delta-lactone, glucoheptonic lactone, and combinations thereof.

2. The composition of claim 1, wherein the acid precursor is configured to generate a quantity of acid within a delay period.

3. The composition of claim 2, wherein the delay period is at least 30 minutes.

4. The composition of claim 2, wherein the delay period is at least 1 hour.

5. The composition of claim 1, wherein a quantity of acid generated by the acid precursor is sufficient to convert at least a portion of the invert emulsion fluid forming the filter cake from a water-in-oil emulsion to an oil-in-water emulsion.

6. The composition of claim 1, wherein the invert emulsion fluid further comprises one or more additives.

7. The composition of claim 6, wherein at least one of the one or more additives comprises an oil-wet solid.

8. The composition of claim 1, wherein the acid-sensitive surfactant is selected from the group consisting of hydrolyzable mixed alkyldiethanol amides, alkyl glucosides, polyalkylglucosides, alkylalkoxypolydimethylsiloxanes, polyalkyldimethylsiloxanes, and combinations thereof.

9. The composition of claim 1, wherein the acid-sensitive surfactant comprises an amine represented by the formula:

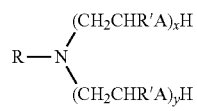

wherein R is $C_{12}$ to $C_{22}$, R' is independently selected from the group consisting of hydrogen and $C_1$ to $C_3$ alkyl group, A is NH or O, and the sum of x and y is from about 1 to about 3.

10. The composition of claim 1, wherein the acid-sensitive surfactant comprises an amine represented by the formula:

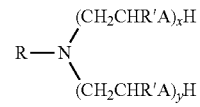

wherein R is a cycloaliphatic hydrocarbon, each R' may be the same or different and is H or an alkyl group having from about 1 to about 3 carbon atoms, each A may be the same or different and is NH or O, and the sum of x and y is from about 1 to about 20.

11. The composition of claim 10, wherein R is a hydrocarbon selected from the group consisting of abietyl, hydroabietyl, dihydroabietyl, tetrahydroabietyl, and dehydroabietyl, R' is H, and A is O.

12. The composition of claim 1, wherein the acid-sensitive surfactant comprises an amine represented by the formula:

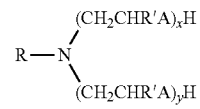

wherein R is an aromatic hydrocarbon, each R' may be the same or different and is H or an alkyl group having from about 1 to about 3 carbon atoms, each A may be the same or different and is NH or O, and the sum of x and y is from about 1 to about 20.

13. A wellbore servicing composition comprising:
   a filter cake positioned within a wellbore, the filter cake comprising an invert emulsion fluid, the invert emulsion fluid comprising an oleaginous fluid, a non-oleaginous fluid, and an acid-sensitive surfactant; and
   an emulsion reversing fluid positioned within the wellbore in contact with the filter cake, the emulsion reversing fluid comprising an acid precursor, wherein the acid precursor is not an acid, and
   wherein the acid precursor is selected from the group consisting of glucono-delta-lactone, glucoheptonic lactone, and combinations thereof, and
   wherein the acid-sensitive surfactant is selected from the group consisting of alkyl glucosides, polyalkylglucosides, alkylalkoxypolydimethylsiloxanes, polyalkyldimethylsiloxanes, and combinations thereof.

* * * * *